United States Patent
Cen

(10) Patent No.: US 6,738,349 B1
(45) Date of Patent: May 18, 2004

(54) NON-INTRUSIVE MEASUREMENT OF END-TO-END NETWORK PROPERTIES

(75) Inventor: Shanwei Cen, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/516,649

(22) Filed: Mar. 1, 2000

(51) Int. Cl.$^7$ .......................... G01R 31/08; H04L 12/28
(52) U.S. Cl. .................... 370/231; 370/252; 370/413
(58) Field of Search .................... 370/231, 235, 370/252, 253, 401, 412, 413, 474; 710/29; 709/224, 228, 223; 700/32

(56) References Cited

U.S. PATENT DOCUMENTS

| | | | |
|---|---|---|---|
| 5,315,580 A | * 5/1994 | Phaal ........................ | 370/13 |
| 5,521,907 A | * 5/1996 | Ennis et al. ................. | 370/17 |
| 5,764,912 A | 6/1998 | Rosborough | |
| 5,917,808 A | 6/1999 | Kosbab | |
| 6,058,102 A | * 5/2000 | Drysdale et al. ............ | 370/252 |
| 6,088,622 A | * 7/2000 | Dollin et al. ................. | 700/28 |
| 6,269,401 B1 | * 7/2001 | Fletcher et al. ............ | 709/224 |

FOREIGN PATENT DOCUMENTS

| | | |
|---|---|---|
| EP | 0 716 525 | 6/1996 |
| EP | 0 948 165 | 10/1999 |

OTHER PUBLICATIONS

Graham, I et al, "Comparative Measurement of QoS On the trans–Pacific Internet", Proceedings of the SPIE, Nov. 2, 1998, vol. 3529, pp. 289–294, XP008008877, the whole document. SPIE, Bellingham, VA, US.

* cited by examiner

Primary Examiner—Duc Ho
(74) Attorney, Agent, or Firm—Francis I. Gray

(57) ABSTRACT

A method and apparatus for non-intrusive measurement of end-to-end properties of network flows uses a passive approach. An ingress monitor non-intrusively intercepts data units as they enter a network path through a network. Likewise an egress monitor non-intrusively intercepts the same data units as they leave the same network path. Each monitor generates a time stamp for each intercepted data unit using a common clock and derives a unique signature for each data unit such that the same data unit has the same signature at the entry as at the exit. Additionally each monitor counts the number of packets received from the network flow at the ingress and egress respectively. The signature, time stamp and packet counter value form an entry which is retained in an entry queue in each monitor. A data correlator coupled to an out-of-band network to which the monitors also are coupled periodically pulls a list of entries from each monitor and correlates the lists by matching signatures. The time stamps for the entries from the respective lists having the same signature are processed to obtain end-to-end latency of the network path, and the difference in counts over a given time period provides end-to-end packet loss measurements.

9 Claims, 2 Drawing Sheets

NON-INTRUSIVE MEASUREMENT OF END-TO-END NETWORK PROPERTIES

BACKGROUND OF THE INVENTION

The present invention relates to testing of networks, and more particularly to a method and apparatus for non-intrusive measurement of end-to-end properties of data transmission through a network path.

A network provides uni-directional virtual or physical path or channel for data transmission. A network flow is a session of data transmission through a network path. In a network flow data units flow from an ingress to an egress of the network path. Example networks are Internet Protocol (IP) networks, Asynchronous Transmission Mode (ATM) networks and circuit-switched, such as telephony, networks. Example data units are IP packets, ATM cells and data bytes (octets). For simplicity the following is described in the environment of IP networks, so the terms IP networks, IP virtual path, IP packet and packet flow are used.

The end-to-end properties of a packet flow may be measured by several metrics, such as throughput, end-to-end latency, packet loss, etc. There are two approaches to measuring the metrics. One is active and the other is passive.

In an active approach packets for monitoring purposes, with special identities and time-stamps, are injected into the ingress of a packet flow. At the egress these special monitoring packets are identified, removed from the flow and time-stamped. Metrics, such as end-to-end latency and packet loss may be measured by analyzing the received monitoring packets. An advantage of the active approach is that it is straightforward and simple, and may be used either online or off-line. The main disadvantage of the active approach when used online is that, no matter how small the injected monitoring packet flow is, these monitoring packets always interfere with the operational packet flow. Also, since the network condition is dynamic, off-line measurement might not reflect the actual properties of the packet flow.

In a passive approach no monitoring packets are injected into the packet flow being monitored. Instead at both the ingress and egress of the packet flow the operational data packets are intercepted without interference to the packet flow itself, and measurement data is generated for each data packet. The measurement data from the two points are correlated, and end-to-end property metrics are derived. In contrast to the active approach the passive approach is non-intrusive. It does not interfere with the operational packet flow in any manner. The cost of this benefit is that the passive approach is much more complex and harder to implement. Due to the reliance on the operational packet flow, the passive approach does not assess the end-to-end properties of a network path before its actual operation.

A passive approach for ATM network monitoring systems is the WAND project by the University of Waitato in New Zealand which is disclosed at http://atm.cs.waikato.ac.nz/wand. WAND focuses on delay measurement for ATM networks, specifically uses a CRC for data correlation (matching of ATM cells), and matches one cell from the ingress to a list of cells from the egress.

What is desired is a non-intrusive method of monitoring end-to-end properties of network flows in an efficient way.

BRIEF SUMMARY OF THE INVENTION

Accordingly the present invention provides a method and apparatus for non-intrusive measurement of end-to-end properties of network flows using a passive approach. An ingress monitor non-intrusively intercepts data units as they enter a network path through a network. Likewise an egress monitor non-intrusively intercepts the same data units as they leave the same network path. Each monitor generates a time stamp for each intercepted data unit using a common clock and derives a unique signature for each data unit such that the same data unit has the same signature at the entry as at the exit. Additionally each monitor counts the number of packets received from the network flow at the ingress and egress respectively. The signature, time stamp and packet counter value form an entry which is retained in an entry queue in each monitor. A data correlator coupled to an out-of-band network to which the monitors also are coupled periodically pulls a list of entries from each monitor and correlates the lists by matching signatures. The time stamps for the entries from the respective lists having the same signature are processed to obtain end-to-end latency of the network path, and the difference in counts over a given time period provides end-to-end packet loss measurements.

The objects, advantages and other novel features of the present invention are described in the following detailed description when read in conjunction with the appended claims and attached drawing.

DETAILED DESCRIPTION OF THE INVENTION

Figure 1:
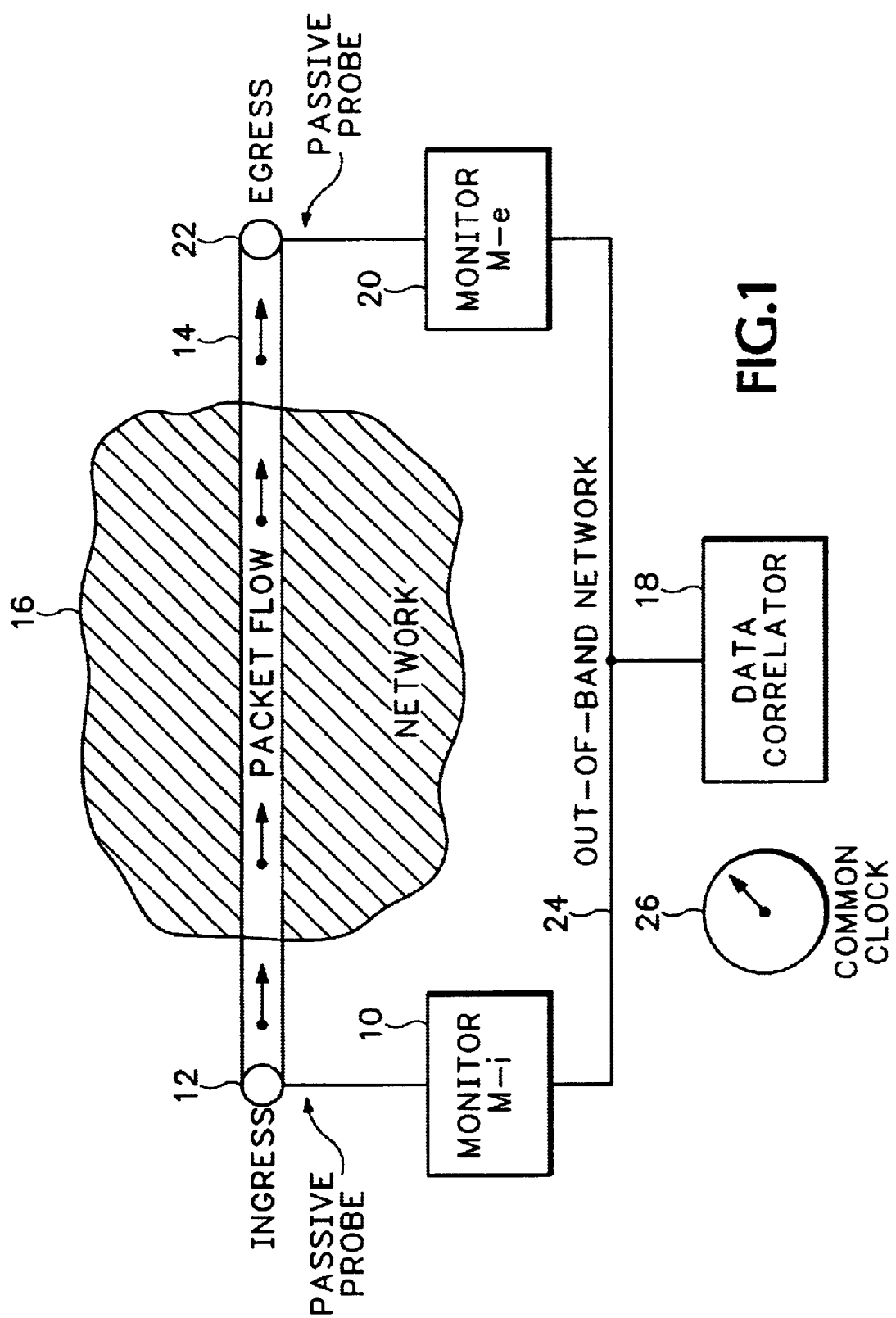
FIG. 1 is an architecture view of a system for non-intrusive monitoring of end-to-end properties of a network path according to the present invention.
Figure 2:
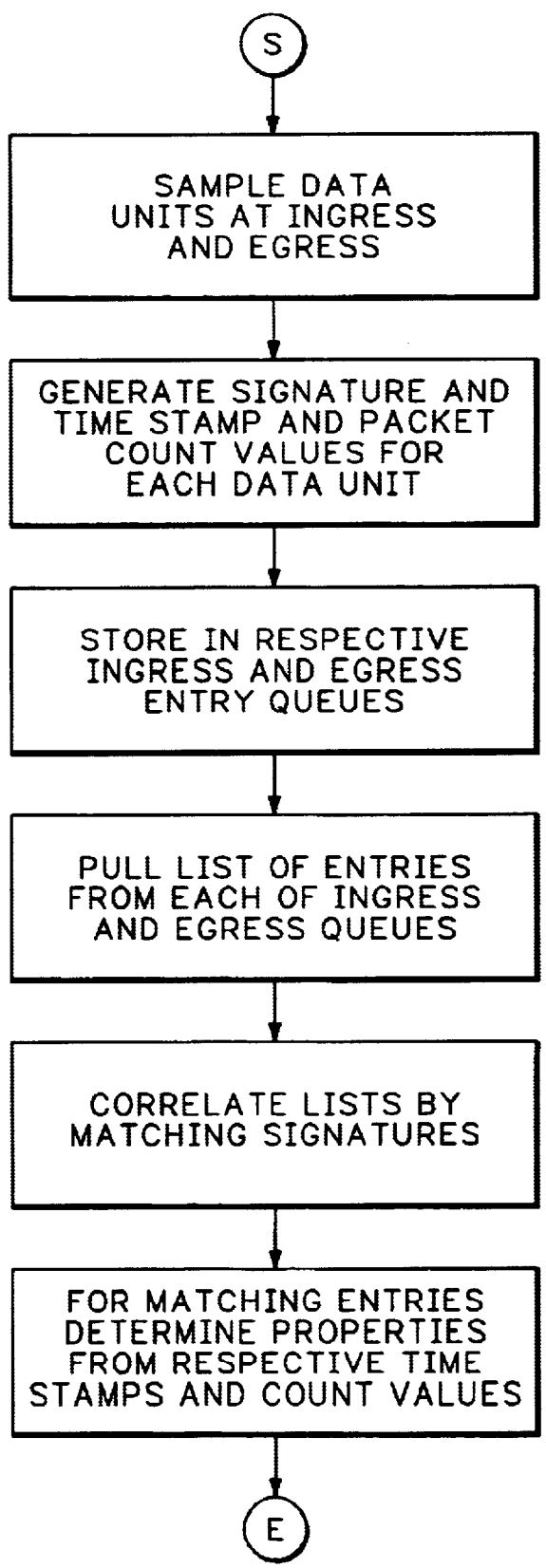
FIG. 2 is a flow chart diagram of a method of non-intrusive monitoring of end-to-end properties of a network path according to the present invention.

Referring now to FIG. 1 an overall architecture of a non-intrusive approach for monitoring end-to-end properties of a network path is shown. To measure the end-to-end properties a monitor 10, 20 is placed at each of the ingress 12 and egress 22 of a packet flow 14 through a network 16. These two monitors 10, 20 are coupled to a data correlator 18 through an out-of-band network 24 that is independent of and does not interfere with the packet flow 14 being monitored. The two monitors 10, 20 and the data correlator 18 have a common clock 26. The two monitors 10, 20 at the two end points 12, 22 intercept packets from the network flow being monitored, count the data packets received, and extract measurement data from the packets, time stamping the measurements. The data correlator 18 pulls the measurement data from the two monitors 10, 20, correlates them to identify the data from the two monitors belonging to the same packets, and derives measurement results.

The monitor 10 at the ingress 12 intercepts in real time all the data packets flowing into the path 14 in a non-intrusive way. When a data packet from the data packet flow 14 is intercepted, the monitor 10 generates a time-stamp and extracts a signature of the data packet. The monitor 10 also keeps a count of all packets received so far. The packet signature is a piece of information to be used to differentiate the data packet in question from other data packets in the same packet flow 14. In most cases a special form of Cyclic Redundancy Check (CRC) of the data packet, such as CRC of all fields in a data packet except those that may change hop by hop in an IP packet header, may be used as the packet signature. Other information, such as some fields of the data packet header, may also be extracted as needed. As a result for each data packet the monitor 10 generates an entry composed of <signature, time-stamp, count>, i.e., the packet signature, and time-stamp together with a count of the packets received so far. The monitor 10 maintains a queue to hold all recent entries in the incremental order of the time-stamps for retrieval and processing by the data correlator 18. Exactly how long a period of times entries are held depends on several factors, such as the end-to-end packet flow latency, bandwidth and latency of the out-of-band network 24 between the data correlator 18 and monitors 10, 20.

The monitor 20 at the egress 22 does exactly the same things as the monitor 10 at the ingress 12 on the data packets flowing out of the egress.

The data correlator 18 samples end-to-end property measurements periodically. During such sampling the data correlator 18 pulls a list of entries from each of the two monitors 10, 20, correlates the two lists and derives end-to-end packet flow property measurements. The data correlator 18 correlates the two lists by matching the packet signatures (S-i; S-e) from the two lists until a subset in one list matches a subset in the other list. When the correlation is done, if one entry in one list matches one entry in the other list, these two entries contain the same packet signature and are considered to be the measurements for the same data packet (P-1). The entry from the ingress monitor 10 (P-i-1<S-i-1, T-i-1, C-i-1>) contains the time-stamp (T-i-1) when the data packet enters the packet flow, while the entry from the egress monitor 20 (P-e-1:<S-e-1, T-e-1, C-e-1>) contains the time-stamp (T-e-1) when the data packet leaves the packet flow, where S-i-1=S-e-1. The difference between these two time-stamps is the end-to-end latency for the data packet to flow through the network path 14. The frequency with which the data correlator 18 pulls data from the monitors 10, 20 and the amount of data it pulls each time depends on the specific configuration in use, the amount of available bandwidth of the out-of-band network 24, and other relevant factors.

At a later time n the data correlator 18 identifies another pair of matched entries (P-i-n: S-i-n,T-i-n,C-i-n), (P-e-n: S-e-n,T-e-n,C-e-n) where S-i-n=S-e-n, then ((C-i-n-C-i-1)-(C-e-n-C-e-1)) is the number of packets lost between P-1 and P-n. The packet loss ratio is ((C-i-n-C-i-1)-(C-e-n-C-e-1))/(C-i-n-C-i-1)-(C-e-n-C-e-1) and the packet loss rate is ((C-i-n-C-i-1)-(C-e-n-C-e-1))/(T-i-n-T-i-1).

The following further illustrates the measurement data correlation. Suppose at time T the data correlator 18 pulls from the monitors 10, 20 all entries between Ts and T, where Ts<T. The list from the ingress monitor 10 is:

List-i: (P-i-1:<S-i-1, T-i-1, C-i-1>, . . . , P-i-m:<S-i-m, T-i-m, C-I-m>) where (P-i-1:<S-i-1, T-i-1, C-i-1>) is an entry with packet signature S-i-1, time-stamp T-i-1 and count C-i-1. The list from the egress monitor is List-e: (P-e-1:<S-e-1, T-e-1, C-e-1>, . . . , P-e-n:<S-e-n, T-e-n, C-e-n>) Suppose that the sub-list (P-i-x1, . . . , P-i-xk) of List-i matches the sub-list (P-e-y1, . . . , P-e-yk) of List-e, i.e., S-i-xj=S-e-yj for j from 1 to k. In that case S-i-xj and S-e-yj are considered to be the packet signatures of the same data packet P-j, and T-i-xj and T-e-yj are the times when the data packet P-j passed the ingress 12 and egress 22 respectively. Then T-e-yj-T-i-xj is the end-to-end latency for the data packet to flow through the network path 14. By calculating the measurements for all the data packets in the matched sub-lists, a set of latency measurements is derived.

Similarly the packet loss between any two data packets may be calculated from their packet count values, as illustrated above.

The latency measurements on individual data packets generated in the above process may be used for analysis of various short-term and long-term latencies of network flows. The latency measurement samples taken over a long period of time (hours, days, weeks or months) may be used to generate statistics, such as percentile, histogram and distribution, for analysis of the long-term distributions and trends in the latency of network flows. Each list of latency measurements that the data correlator 18 gets covers a short period of time and may be used to derive short-term latency jitter. By sampling lists of latency measurements periodically the long-term trends of latency jitter may be analyzed.

Similarly based on the individual packet loss measurements short-term and long-term packet loss properties may be analyzed.

In the above discussion for purposes of illustration it is assumed that the data correlator 18 periodically pulls measurement packet lists from the ingress and egress monitors 10, 20. In an actual application the ingress and egress monitors 10,20 may push the measurement packets to the data correlator 18. In fact the push model may be more efficient in some cases.

The architecture of FIG. 1 is conceptual. In actual implementations in order to reduce the bandwidth requirements of the out-of-band network 24 the data correlator 18 function may be located in one of the two monitors 10, 20. The combined data processor/monitor implementation has at least two advantages: (a) there is a reduced network bandwidth requirement; and (b) it is feasible for the data correlator 18 to get a much longer list of data from the resident monitor 10, 20, thus increasing the search space during data correlation. On the other hand a physically separate data correlator 18 may easily be shared by multiple pairs of monitors 10, 20 monitoring different packet flows. This data correlator 18 may also serve as a centralized location for measurement network configuration and management. In the case where a large number of packet flows are to be monitored simultaneously, more than one data correlator 18 may be needed to distribute the workload among them.

Subsampling of measurement packets may be necessary if the monitors 10, 20, the out-of-band network 24 or the data processor 18 cannot capture, transport or process the measurement data of all the data packets in the packet flow. With measurement packet subsampling the monitors 10, 20 still count all packets, but only generate measurement data of a selective subset of the data packets in the packet flow, and the end-to-end properties are derived from the measurement data of this subset of data packets. There are two requirements a subsampling scheme has to satisfy. One requirement is that the ingress and egress monitors 10, 20 select the same subset of data packets. Otherwise if the two measurement data lists from the two end-points 12, 22 are for different sets of data packets, it becomes impossible to derive the end-to-end properties. The other requirement is that the sampling be periodical or random additive based on some statistical distribution. Signature bit masking is a subsampling scheme that satisfies both requirements. With signature bit masking a data packet is selected only if the least significant part of its signature has a specific given value. For example to subsample one-eighth of the data packets, select only those data packets whose signature has 000 as its least significant three bits. If a data packet is selected by the ingress monitor 10, it also is selected by the egress monitor 20 since the packet signature does not change inside the packet flow 14. When CRC is used for the signature, since CRC is well randomized, signature bit masking becomes a very good form of geometric sampling in which a packet is selected with a fixed probability, which is a form of random additive sampling.

The uniqueness of the packet signature affects the reliability of the data correlation by the data correlator 18. Different data packets may have the same content and thus the same CRC. Even data packets with different contents may have the same CRC. Non-uniqueness of packet signatures introduces ambiguity in the list correlation. Carefully selecting the fields to be included in the special CRC for the packet signature helps to improve uniqueness. For example since the packet identification field in an IP header contains the value of a counter which normally increments by one upon sending of each IP packet by a host, inclusion of this field in the packet signature CRC may make the packet signatures of multiple packets unique even if they contain the same payload. There may be cases when there are more than one way the measurement data lists from the two monitors 10, 20 match against each other. If this ambiguity occurs, there is no way to tell reliably which match is correct. As a result it is not possible to derive latency measurements from the two lists in question. Increasing the number of entries in the list of measurement data pulled from the monitors 10, 20 helps to reduce the probability of ambiguity, but requires more bandwidth from the out-of-band network 24.

Some of the properties of IP networks made data correlation more complicated. IP packets may not only be dropped, they may also be duplicated or fragmented by the network 16. They also may be delivered out of order. Depending upon the configuration of the network 16, some of these problems may not exist.

When the present invention is applied to ATM networks, some form of CRC may still be used as the cell signature. When applied to circuit-switched networks in which the data units are bytes, the whole byte itself may be used in place of its signature.

Thus the present invention provides non-intrusive measurements of end-to-end properties of network flows by sampling the data packets at both the ingress and egress of the network flow being measured, assigning a unique signature and time-stamp using a common system clock for each packet as well as a count of packets received so far, correlating lists of packets from both ingress and egress based on the unique signature, and using the time-stamps and counts for the same packet at ingress and egress obtaining measurements of the desired end-to-end properties of the network flow.

What is claimed is:

1. A method of non-intrusive measurement of end-to-end properties of a network flow, the network flow being a session of data units flowing from an ingress to an egress of a network path, comprising the steps of:

sampling the data units at the ingress using an ingress monitor;

generating a unique signature and input measurement data for each sampled data unit at the ingress monitor;

sampling the data units from the network flow at the egress using an egress monitor;

generating the unique signature and output measurement data for each sampled data unit at the egress monitor;

correlating entries from each of the ingress and egress monitors, the entries being in the form of a list for each monitor and each entry having the unique signature and associated measurement data for one of the data units, by matching the unique signatures from entries between the two lists; and determining from the input and output measurement data for the matched entries the end-to-end properties of the network flow, wherein the input and output measurement data include counts of the numbers of data units received by the ingress and egress monitors respectively so far.

2. The method as recited in claim 1 wherein the input and output measurement data are timestamps indicating the time of receipt of the data units at the ingress and egress monitors, the timestamps being derived from a common clock.

3. The method as recited in claim 1 further comprising the step of subsampling the data units prior to the generating steps such that the ingress and egress monitors select the same subsampled data units with a random additive distribution.

4. The method as recited in claim 3 wherein the subsampling step comprises the step of masking of the unique signature such that only if the least significant portion of the unique signature has a specific given value is the data unit selected by the ingress and egress monitors.

5. A system for non-intrusive measurement of end-to-end properties of a network flow comprising:

an ingress monitor coupled to the input of the network flow for intercepting data units flowing through a network path, the ingress monitor identifying a unique signature and generating input measurement data for each data unit;

an egress monitor coupled to the output of the network flow for intercepting the data units flowing through the network path, the egress monitor identifying the unique signature and generating output measurement data for each data unit; and a data correlator coupled to an out-of-band network to which the ingress and egress monitors are also coupled, the data correlator pulling lists of entries from the ingress and egress monitors, the entries containing the unique signature and measurement data for each data unit, correlating the lists of entries based on the unique signatures, and determining from the input and output measurement data of data units having the same unique signatures the end-to-end properties for the network flow.

6. The system as recited in claim 5, wherein the input and output measurement data are timestamps for the data units derived from a common clock indicating the time of arrival at the ingress and egress monitors respectively.

7. The system as recited in claims 5 or 6 wherein the input and output measurement data are counts of the number of data units received at the ingress and egress monitors respectively so far.

8. The system as recited in claim 5 wherein the ingress and egress monitors subsample the data units prior to generating measurement data, the data units selected being the same at the ingress and egress monitors with a random additive distribution.

9. The system as recited in claim 8 wherein the data units are subsampled based upon a given value for a least significant portion of the unique signature.

* * * * *